United States Patent
Cody (10) Patent No.: US 11,178,047 B2
(45) Date of Patent: Nov. 16, 2021

(54) TAILORED CONTACT PLAN GENERATION

(71) Applicant: Raytheon Company, Waltham, MA (US)

(72) Inventor: Mac Allen Cody, Richardson, TX (US)

(73) Assignee: Raytheon Company, Waltham, MA (US)

( * ) Notice: Subject to any disclaimer, the term of this patent is extended or adjusted under 35 U.S.C. 154(b) by 95 days.

(21) Appl. No.: 16/742,368

(22) Filed: Jan. 14, 2020

(65) Prior Publication Data

US 2021/0218666 A1 Jul. 15, 2021

(51) Int. Cl.
| | | |
|---|---|---|
| *H04L 12/721* | (2013.01) | |
| *H04W 28/02* | (2009.01) | |
| *H04W 84/18* | (2009.01) | |
| *H04M 15/00* | (2006.01) | |

(52) U.S. Cl.
CPC ............ *H04L 45/34* (2013.01); *H04M 15/41* (2013.01); *H04W 28/0236* (2013.01); *H04W 84/18* (2013.01); *H04M 2215/0164* (2013.01)

(58) Field of Classification Search
CPC .. H04L 45/34; H04W 28/0236; H04W 84/18; H04M 15/41; H04M 2215/0164
See application file for complete search history.

(56) References Cited

U.S. PATENT DOCUMENTS

| | | | |
|---|---|---|---|
| 5,678,174 A | 10/1997 | Tayloe | |
| 6,115,580 A | 9/2000 | Chuprun et al. | |
| 10,257,655 B2 | 4/2019 | Cody | |
| 10,764,120 B1* | 9/2020 | Means | H04L 41/0893 |
| 10,813,033 B1* | 10/2020 | Wu | H04W 40/26 |
| 2010/0080222 A1* | 4/2010 | Mohapatra | H04L 12/4641 370/392 |
| 2014/0003227 A1* | 1/2014 | Scudder | H04L 45/021 370/218 |
| 2016/0248658 A1* | 8/2016 | Patel | H04L 45/127 |
| 2017/0054628 A1* | 2/2017 | Tomotaki | H04L 12/4633 |
| 2017/0331710 A1 | 11/2017 | Cody | |

(Continued)

OTHER PUBLICATIONS

"U.S. Appl. No. 15/154,127, Non Final Office Action dated May 17, 2018", 8 pgs.

(Continued)

*Primary Examiner* — Hassan Kizou
*Assistant Examiner* — Abdullahi Ahmed
(74) *Attorney, Agent, or Firm* — Schwegman Lundberg & Woessner, P.A.

(57) ABSTRACT

A system generates a tailored contact plan using a set of contact commands that represent a contact plan of communication opportunities between nodes in a network, an identification of restricted nodes in the network, and an identification of a target node. The system processes the records in the contact plan by writing a record to the tailored contact plan when the record is not a contact command; or writing the record to the tailored contact plan when the record includes the contact command, and a source node in the record is not a restricted node or the source node in the record is the target node; or writing the record to the tailored contact plan when the record includes the contact command and the destination node in the record is the target node. The target node uses the tailored contact plan to route data through the network.

20 Claims, 10 Drawing Sheets

(56) References Cited

U.S. PATENT DOCUMENTS

2017/0339510 A1* 11/2017 Condeixa ............... H04W 4/70
2018/0227212 A1* 8/2018 Ferguson ............ H04L 12/4625

OTHER PUBLICATIONS

"U.S. Appl. No. 15/154,127, Examiner Interview Summary dated Aug. 3, 2018", 3 pgs.

"U.S. Appl. No. 15/154,127, Response filed Aug. 16, 2018 to Non-Final Office Action dated May 17, 2018", 9 pgs.

"U.S. Appl. No. 15/154,127, Notice of Allowance dated Nov. 28, 2018", 7 pgs.

"U.S. Appl. No. 15/154,127, Response to Examiner's Reasons for Allowance filed Feb. 25, 2019", 1 pg.

Bourke, Paul, "Intersection of a Line and a Sphere (or circle)", [Online] Retrieved from the Internet:URL: http: www.homer.com.au webdoc geometry sphereline.htm, (Nov. 1992), 2 pgs.

De Rango, F, "Epedimic Strategies in Delay Tolerant Networks from an Energetic Point of View: Main Issues and Performance Evaluation", Journal of Networks ; Oulu, vol. 10, Issue 1,, (Jan. 2015), 4-14.

Lai, Yongxuan, "Adaptive Data Gathering in Mobile Sensor Networks Using Speedy Mobile Elements", Sensors vol. 15, Issue 9,, (2015), 23218-23248.

Tsao, Philip, "Automated Contact Graph Generation with SPSCGR", [Online] Retrieved from the Internet: URL: http: robotics.estec.esa.int IWPSS IWPSS_2013 IPWSS_2013_Proceedings 18_Tsao.pdf, (2013), 3 pgs.

Vallado, David A., "Readme file for paper AIAA 2006-6753", (Jul. 16, 2012), 6 pgs.

Zaheer, Muhammad, "Kinematic orbit determination of low Earth orbiting satellites, using satellite-to-satellite tracking data and comparison of results with different propagators", Masters Thesis, School of Architecture and the Built Environment Royal Institute of Technology (KTH), (Mar. 2014), 76 pgs.

Zhou, Ning, "Onboard Orbit Determination Using GPS Measurements for Low Earth Orbit Satellites", PhD thesis, Queensland University of Technology, (Dec. 2004), 262 pgs.

"International Application Serial No. PCT US2021 013283, International Search Report dated May 3, 2021", 4 pgs.

"International Application Serial No. PCT US2021 013283, Written Opinion dated May 3, 2021", 8 pgs.

Burleigh Jet, Propulsion Laborato S, "Contact Graph Routing; draft-burleigh-dtnrg-cgr-01.txt", Contact Graph Routing; Draft-Burleigh-Dtnrg-Cgr-01.Txt, Internet Engineering Task Force, Ietf; Standardworkingdraft, Internet Society (ISOC) 4, Rue Des Falaises Ch- 1205 Geneva, Switzerland, No. 1, (Jul. 9, 2010), 1-17.

Edward, Birrane, "Analysis of the contact graph routing algorithm: Bounding interplanetary paths", Acta Astronautica, Pergamon Press, Elmsford, GB, vol. 75, (Feb. 3, 2012), 108-119.

* cited by examiner

Left table (410A):

| | | | 430 | 435 | 450 |
|---|---|---|---|---|---|
| a range | +<ts> | +<te> | GS₁ | S₁ | 1 <data rate> |
| a contact | +<ts> | +<te> | GS₁ | S₁ | 1 <data rate> |
| a contact | +<ts> | +<te> | S₁ | GS₁ | 1 <data rate> |
| a range | +<ts> | +<te> | GS₁ | S₂ | 1 <data rate> |
| a contact | +<ts> | +<te> | GS₁ | S₂ | 1 <data rate>  ← 425 |
| a contact | +<ts> | +<te> | S₂ | GS₁ | 1 <data rate>  ← 420 |
| a range | +<ts> | +<te> | GS₁ | S₃ | 1 <data rate> |
| a contact | +<ts> | +<te> | S₃ | S₃ | 1 <data rate> |
| a contact | +<ts> | +<te> | GS₁ | S₄ | 1 <data rate> |
| a range | +<ts> | +<te> | S₄ | GS₁ | 1 <data rate> |
| a contact | +<ts> | +<te> | GS₂ | S₁ | 1 <data rate> |
| a contact | +<ts> | +<te> | S₁ | GS₂ | 1 <data rate> |
| a range | +<ts> | +<te> | GS₂ | S₂ | 1 <data rate> |
| a contact | +<ts> | +<te> | S₂ | GS₂ | 1 <data rate> |
| a contact | +<ts> | +<te> | GS₂ | S₃ | 1 <data rate> |
| a range | +<ts> | +<te> | S₃ | GS₂ | 1 <data rate> |

410A, 440: <ts>, 445: <te>

415

Right table (410B):

| a range | +<ts> | +<te> | GS₂ | S₄ | 1 <data rate> |
|---|---|---|---|---|---|
| a contact | +<ts> | +<te> | GS₂ | S₄ | 1 <data rate> |
| a contact | +<ts> | +<te> | S₄ | GS₂ | 1 <data rate> |
| a range | +<ts> | +<te> | S₁ | S₂ | 1 <data rate> |
| a contact | +<ts> | +<te> | S₁ | S₂ | 1 <data rate> |
| a contact | +<ts> | +<te> | S₂ | S₁ | 1 <data rate> |
| a range | +<ts> | +<te> | S₁ | S₃ | 1 <data rate> |
| a contact | +<ts> | +<te> | S₃ | S₁ | 1 <data rate> |
| a contact | +<ts> | +<te> | S₁ | S₄ | 1 <data rate> |
| a range | +<ts> | +<te> | S₄ | S₁ | 1 <data rate> |
| a contact | +<ts> | +<te> | S₂ | S₃ | 1 <data rate> |
| a contact | +<ts> | +<te> | S₂ | S₃ | 1 <data rate> |
| a range | +<ts> | +<te> | S₂ | S₄ | 1 <data rate> |
| a contact | +<ts> | +<te> | S₄ | S₂ | 1 <data rate> |
| a contact | +<ts> | +<te> | S₃ | S₄ | 1 <data rate> |
| a contact | +<ts> | +<te> | S₄ | S₃ | 1 <data rate> |

FIG. 4B

510
```
a range    +<t_s> +<t_e>
a contact  +<t_s> +<t_e>  GS_1  S_1   1  <data rate>
a contact  +<t_s> +<t_e>  GS_1  S_1   1  <data rate>
```

520
```
a range    +<t_s> +<t_e>
a contact  +<t_s> +<t_e>  S_1    GS_1  1  <data rate>
a contact  +<t_s> +<t_e>  GS_1  S_2    1  <data rate>
a range    +<t_s> +<t_e>
a contact  +<t_s> +<t_e>  S_2   GS_1   1  <data rate>
a contact  +<t_s> +<t_e>  GS_1  S_3    1  — 522  <data rate>
a range    +<t_s> +<t_e>
a contact  +<t_s> +<t_e>  S_3   GS_1   1  <data rate>
a contact  +<t_s> +<t_e>  GS_1  S_4    1  <data rate>
a range    +<t_s> +<t_e>
a contact  +<t_s> +<t_e>  S_4   GS_1   1  <data rate>
a contact  +<t_s> +<t_e>  GS_2  S_1    1  — 531  <data rate>
```

530
```
a range    +<t_s> +<t_e>
a contact  +<t_s> +<t_e>  S_1   GS_2   1  — 532  <data rate>
a contact  +<t_s> +<t_e>  GS_2  S_2    1  <data rate>
a range    +<t_s> +<t_e>
a contact  +<t_s> +<t_e>  S_2   GS_2   1  <data rate>
a contact  +<t_s> +<t_e>  GS_2  S_3    1  <data rate>
```

(continued)
```
a range    +<t_s> +<t_e>
a contact  +<t_s> +<t_e>  GS_2  S_4    1  <data rate>
a contact  +<t_s> +<t_e>  S_4   GS_2   1  <data rate>
a range    +<t_s> +<t_e>
a contact  +<t_s> +<t_e>  S_1   S_2    1  <data rate>
a contact  +<t_s> +<t_e>  S_1   S_2    1  <data rate>
a range    +<t_s> +<t_e>
a contact  +<t_s> +<t_e>  S_2   S_1    1  <data rate>
a contact  +<t_s> +<t_e>  S_1   S_3    1  <data rate>
a range    +<t_s> +<t_e>
a contact  +<t_s> +<t_e>  S_3   S_1    1  <data rate>
a contact  +<t_s> +<t_e>  S_1   S_4    1  <data rate>
a range    +<t_s> +<t_e>
a contact  +<t_s> +<t_e>  S_4   S_1    1  <data rate>
a contact  +<t_s> +<t_e>  S_2   S_3    1  <data rate>
a range    +<t_s> +<t_e>
a contact  +<t_s> +<t_e>  S_3   S_2    1  <data rate>
a contact  +<t_s> +<t_e>  S_2   S_4    1  <data rate>
a range    +<t_s> +<t_e>
a contact  +<t_s> +<t_e>  S_4   S_2    1  <data rate>
a contact  +<t_s> +<t_e>  S_3   S_4    1  <data rate>
a range    +<t_s> +<t_e>
a contact  +<t_s> +<t_e>  S_4   S_3    1  <data rate>
```

TAILORED CONTACT PLAN GENERATION

TECHNICAL FIELD

Embodiments described herein generally relate to a system and method that supports selective routing of data through a network, and in an embodiment, but not by way of limitation, using a tailored contact plan to support selective routing of data through a Delay or Disruption Tolerant network.

BACKGROUND

A Delay or Disruption Tolerant Network (DTN) is a computer network architecture that seeks to address the technical difficulties for communicating in environments that lack continuous network connectivity, for example, between satellites with ground stations. For this type of network, several methods exist for routing data bundles between network nodes. For example, one method is referred to as Schedule Aware Bundle Routing (SABR), which is a forwarding-based routing scheme. A Contact Plan is a component of SABR that provides information about the times and durations when connectivity exists between network nodes. A Contact Graph Routing (CGR) algorithm uses the Contact Plan to generate a Contact Graph which specifies the most efficient route for data bundles across the network from a source network node to a destination network node.

An issue with SABR and Contact Plans is that Contact Plans do not provide any restrictions on routing data bundles through network nodes that should only be sources or sinks of data. An example is when network nodes may not have the hardware resources to support the data volume required for the data bundle routing. Another example is when network nodes may not be authorized to have access to data that are not addressed to the network nodes. Current networks are not able to address this problem.

Ideally, any solution to prevent undesired data bundle routing through a DTN should use the underlying DTN Contact Plan and Contact Graph Routing mechanisms and not require in-compatible and non-compliant modifications.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

FIGS. 4A and 4B illustrate an example embodiment of the creation of a Tailored Contact Plan.

DETAILED DESCRIPTION

One or more embodiments of the present disclosure create and use tailored contact plans to support routing of data through a Delay or Disruption Tolerant network (DTN). An embodiment tailors DTN Contact Plans into a Tailored Contact Plan to restrict data bundle routing without making any modifications to the underlying DTN Contact Plan mechanisms or Contact Graph route planning algorithms. The embodiment functions with any size Contact Plan and any number of restricted nodes, and requires only a minimal amount of intermediate storage during processing because of the method described. Each record or line is processed individually and information stored only in support of the current record or line being processed. In short, an embodiment is a process to tailor Contact Plans to prevent undesired routing behaviors to restricted network nodes.

Specifically, an embodiment receives as input a DTN Contact Plan, a list of DTN node identifications for those nodes that need to have routing restricted, and the node identification of a target node for which a Tailored Contact Plan is being generated. The embodiment parses through the records or lines in the Contact Plan and removes contact entries for the restricted nodes such that these restricted nodes appear to the target node as not being able to transmit data bundles to any node other than the target node. Thereafter, when the target node constructs Contact Graphs based upon its Tailored Contact Plan, the target node will not plan to route data bundles through the restricted nodes. This addresses the issue of transmitting data through nodes that cannot handle the data volume and nodes that do not have the proper security level to handle the data.

The Contact Plan includes records, some of which are identified as contact commands. Contact commands specify the periods of time of contacts and associated distance ranges between nodes in a network. Other supporting information is also included in the Contact Plan such as the data transmission rates between nodes and directives for node time reference and performance management. Referring to FIG. 4A, which is an example embodiment of a Contact Plan that will be discussed in detail herein, the Contact Plan includes records 410A and 410B. Record 410A indicates that the record is a range record, and record 410B indicates that the record is a contact command record. Column 430 contains nodes that are source nodes in the network, and column 435 contains nodes that are destination nodes in the network. A node can function as both a source node and a destination node. Column 440 contains the time for the start of a period of communications availability, and column 445 contains the time for the end of a period of communications availability. Note that the information in column 440 and 445 do not have any influence upon the embodiment described and are only representative for this discussion. Column 450 includes the data rate that is associated with data transmission between the source node 430 and the destination node 435.

An embodiment processes the Contact Plan into a Tailored Contact Plan, which is a subset of the Contact Plan, for each target node. All restricted contact commands or nodes referenced to the target node have bidirectional connectivity retained. All contact commands in the records of the Contact Plan that include restricted nodes and that do not include the target node have their outbound contact command records removed, thereby giving them unidirectional, inbound connectivity (i.e., a data sink), as far as the target node considers them for Contact Graph Routing. All records in the Contact Plan that do not represent a contact command are not processed, but simply written to the Tailored Contact Plan.

In an embodiment, the generation of the Tailored Contact Plan involves the following steps. As noted above, a particular Tailored Contact Plan is individually generated for each particular target node. A first record or line is read from the Contact Plan. If the first line does not represent a contact command, the line is written to the Tailored Contact Plan and the next line in the Contact Plan is processed. Otherwise, the first line is further processed as follows. If the source node ID in the contact command is not a restricted node or the source node ID is the target node, the first line is written to the Tailored Contact Plan. Otherwise, the first line is further processed as follows. If the destination node ID in the contact command is the target node, the first line is written to the Tailored Contact Plan. If the first line is written to the Tailored Contact Plan, the process then processes one by one in this just-described manner the remaining records or lines in the Contact Plan. If after the just-described processing the first line is not written to the Tailored Contact Plan, the first line is simply discarded (i.e., it is not written to the Tailored Contact Plan) and the rest of the records in the Contact Plan are processed one by one in the just-described manner.

Figure 1:
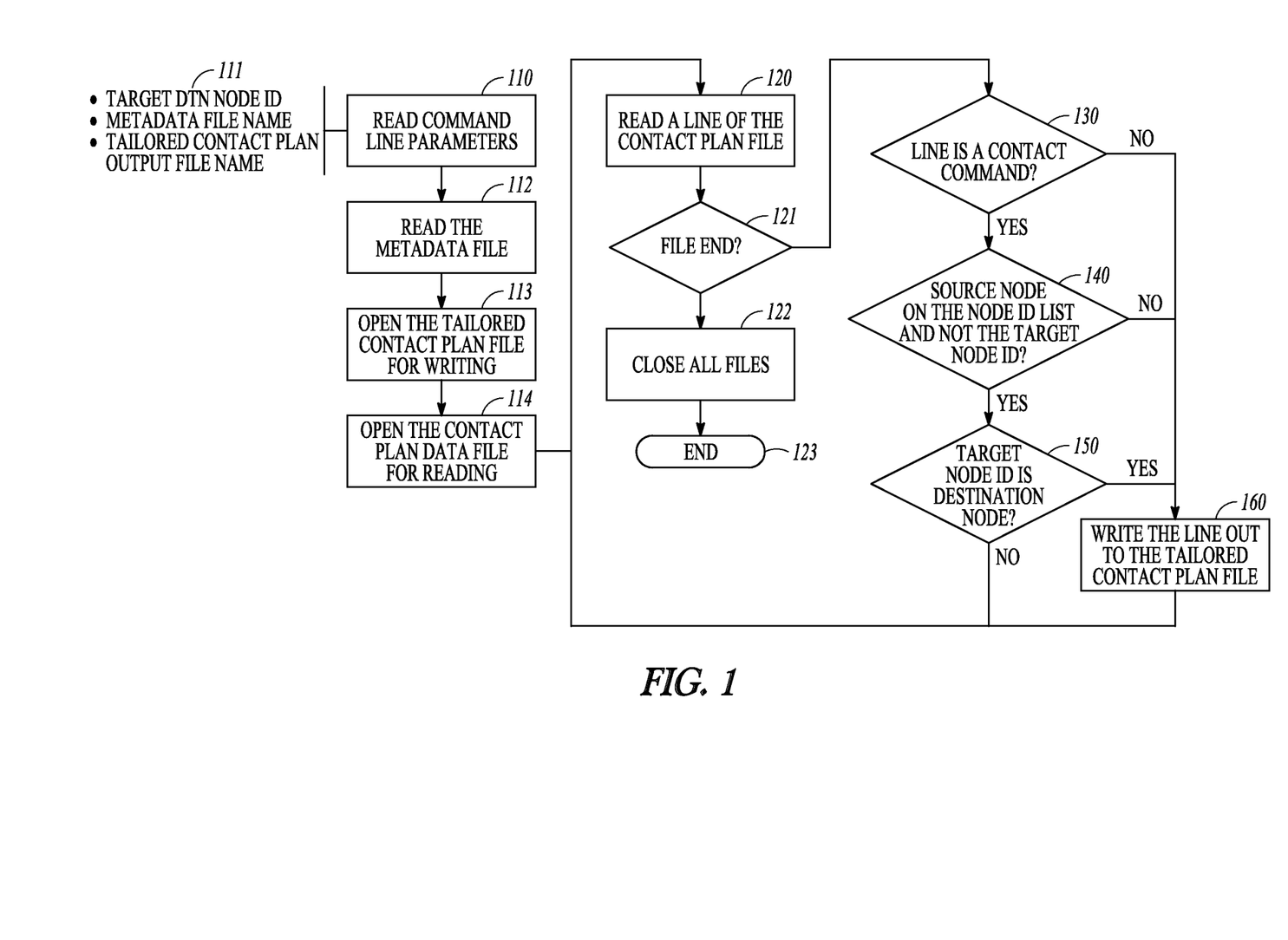
FIG. 1 is a flowchart of an example embodiment to create a Tailored Contact Plan.

FIG. 1 is a flow diagram illustrating this process. Referring to FIG. 1, at 110, command line parameters are read. As illustrated at 111, these parameters can include the target DTN node id, the name of a metadata file, and the name of the Tailored Contact Plan output file. At 112, the metadata file is read. The metadata file can include the name of the file that contains the Contact Plan and a list of the restricted nodes in the DTN. As noted above, an example of a Contact Plan is illustrated in FIG. 4A. In an embodiment, the Contact Plan file can include blank lines and lines beginning with a comment character such as the "#" sign. These lines are ignored in the processing. The first significant line contains the path and name of the file that contains the input Contact Plan, and the next significant line contains a list of all the DTN node IDs in the DTN. At 113, the Tailored Contact Plan file is opened for writing, and at 114, the Contact Plan file is opened for reading.

At 120, a line is read from the Contact Plan file. If the process is at the end of the Contact Plan file at 121, all files are closed at 122 and the process ends at 123. If the end of the Contact Plan file has not been reached at 121, then at 130, it is determined if the line from the Contact Plan file includes a contact command. If the line does not include a contact command, then the line is written to the Tailored Contact Plan file at 160, and the next line in the Contact Plan file is read at 120. If the line does contain a contact command, the line is further processed at operation 140.

At 140, the process determines if the source node in the line is a restricted node and that the source node is not the target node. If both of these conditions are true, the line is processed further at operation 150. If both of these conditions are not true, then the line is written to the Tailored Contact Plan at 160, and the next line in the Contact Plan file is read at 120.

At 150, the process determines if the destination node in the line is the target node. If the destination node is the target node, the line is written to the Tailored Contact Plan file at 160 and the next line in the Contact Plan is read at 120. If the destination node is not the target node, then the line is not written to the Tailored Contact Plan file and the next line in the Contact Plan is read at 120.

Each record or line of data processed in the Contact Plan is independent. Consequently, parallelization of this process is possible. However, the original ordering of the records or lines should be maintained in the Tailored Contact Plan, since there are time-based characteristics in the data in each record of the Contact Plan. As alluded to above, a purpose of the Tailored Contact Plan is to control Contact Graph Routing (CGR) in the DTN. An intention is to prevent particular network nodes from being selected in a Contact Graph as intermediate routers for data bundles (because of hardware or security concerns for example). An example use case is a DTN consisting of low earth orbit (LEO) satellite nodes and ground station nodes, with the ground stations acting only as sources or destinations of data bundles. This example use case reduces ground station resource requirements (e.g., datalink bandwidth, data bundle storage) and reduces security issues in handling data bundles not destined for the ground station.

Figure 2:
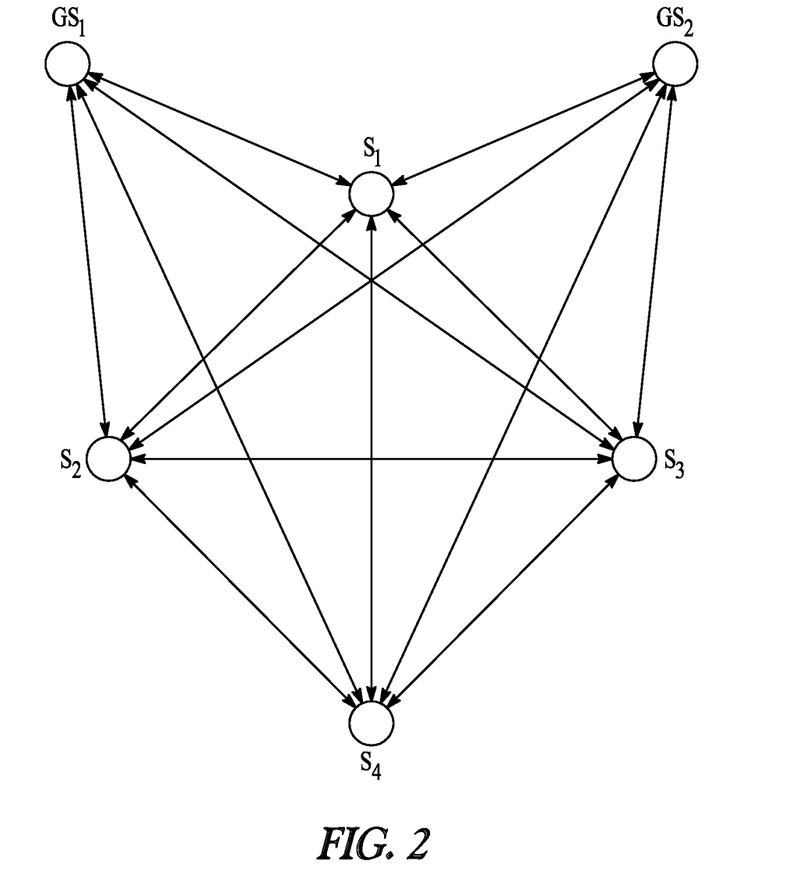
FIG. 2 is a diagram of an example network.

FIG. 2 is a diagram illustrating a particular example of a network. Referring to FIG. 2, a DTN consists of two ground station nodes $GS_1$ and $GS_2$ and four satellite nodes $S_1$, $S_2$, $S_3$, and $S_4$. FIG. 2 illustrates the opportunities for bidirectional data flow between each of the network nodes. It should be noted that in FIG. 2 the ground station nodes do not have direct connectivity on the network, and further noted that the nodes in FIG. 2 only indicate the potential for connectivity, not continuous connectivity. Due to the nature of Contact Graph Routing (CGR), it is entirely possible for data bundles to be routed through the ground station nodes, which is not desirable. To prevent this, the Contact Plan is processed into the Tailored Contact Plan so that CGR planning does not route data bundles through the ground station nodes. As previously noted, there is a unique tailoring of the Contact Plan for each node in the network. As referred to previously, tailoring involves removing contact commands from the Contact Plan for a given target node such that ground station nodes that are not directly connected to that target node will only appear able to receive data, and not retransmit or forward that data.

Figure 3:
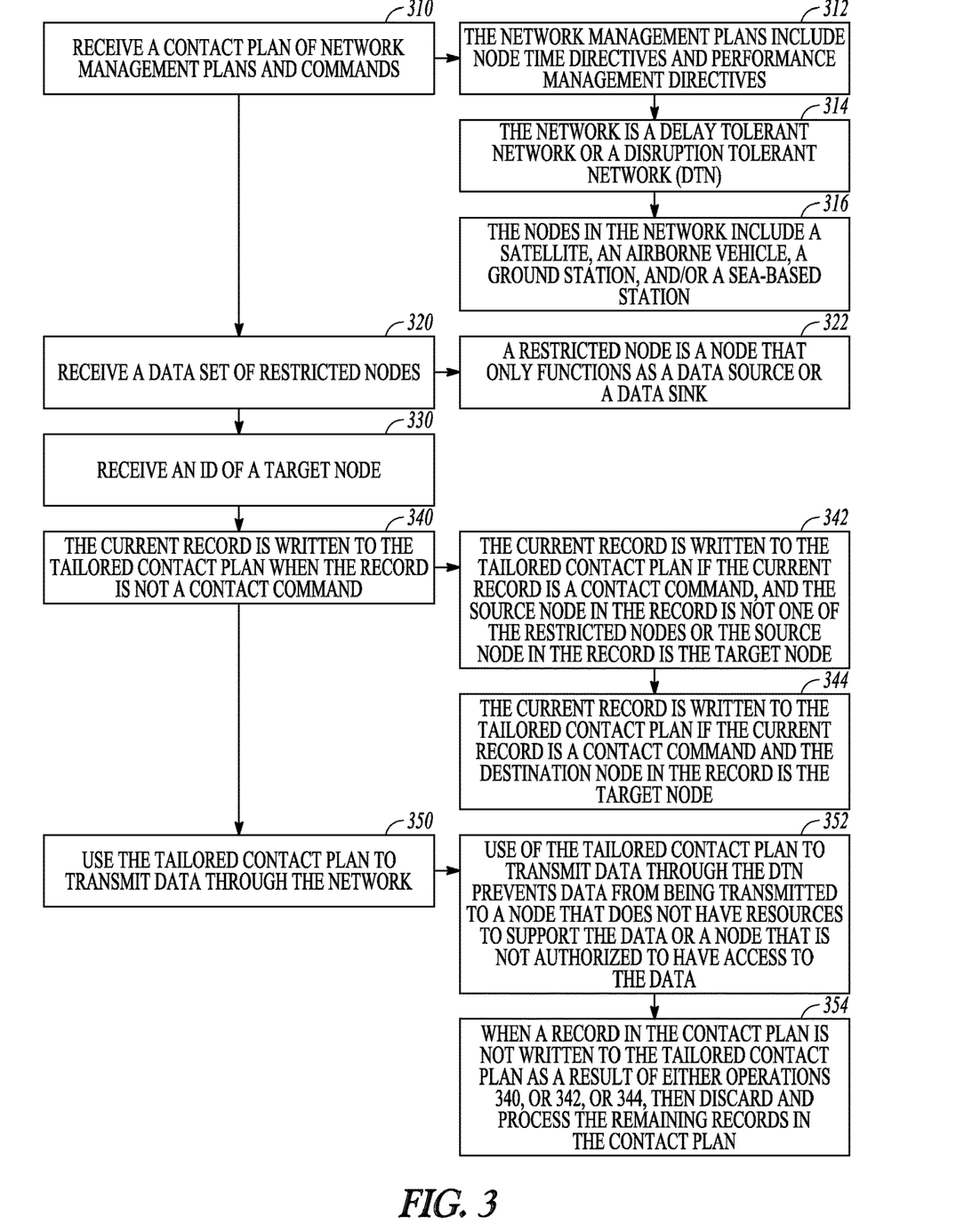
FIG. 3 is a flowchart of another example embodiment to create a Tailored Contact Plan.

FIG. 3 is another flow diagram illustrating a process of generating a Tailored Contact Plan from a Contact Plan for a particular target node in a DTN. FIG. 3 includes process blocks 310-354. Though arranged substantially serially in the examples of FIG. 3, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to FIG. 3, at 310, a Contact Plan is received into a computer processor. The Contact Plan includes records of network management commands. The network management commands include contact commands and range commands (distances or data transmission rates) that represent the Contact Plan of communication opportunities between nodes in a network. The network management plans further include node time directives and performance management directives (312). Node time directives are specified with the "at" (@) command, which specify the reference time that will be used for interpreting relative time values, and performance management directives include "m" commands, which are used to set the time difference between time represented on the computer and UTC time, the known accuracy of the scheduled start and stop times, and the data heap occupancy limits for inbound and outbound data. As indicated at 314, in an embodiment, the network is a Delay Tolerant Network or a Disruption Tolerant Network (DTN). From such a Contact Plan, a contact graph is generated, which includes contact graph data that indicate communication links, such as line of sight communication links, between nodes in a network. And as indicated at 316, the nodes in the network can include a satellite, an airborne vehicle, a ground station, and/or a sea-based station.

At 320, a data set is received into the computer processor. The data set includes an identification of one or more restricted nodes in the network. As noted previously, a restricted node is a node that for hardware reasons, security reasons, or other reasons, should only function as a data source or a data sink, and should not act as an intermediate node (322). At 330, an identification of a target node is received into the computer processor.

Then, beginning at 340 and continuing through 344, a Tailored Contact Plan is generated by processing each record in the Contact Plan as follows. At 340, the current record that is being processed is written to the Tailored Contact Plan when the record is not a contact command. That is, referring to FIG. 4, the record in the Contact Plan is identified as "a range" 410A and not "a contact" 410B. If at 340, the current record is written to the Tailored Contact Plan, the next record is retrieved from the Contact Plan. If at 340 the current record is not written to the Tailored Contact Plan, then at 342, the current record is written to the Tailored Contact Plan if the current record is a contact command, and the source node in the record is not one of the restricted nodes or the source node in the record is the target node. If at 342, the current record is written to the Tailored Contact Plan, the next record is retrieved from the Contact Plan. If at 342 the current record is not written to the Tailored Contact Plan, then at 344, the current record is written to the Tailored Contact Plan if the current record is a contact command and the destination node in the record is the target node. If at 344, whether or not the current record is written to the Tailored Contact Plan, the processing of that current record is completed, and the next record is retrieved from the Contact Plan for processing.

After all the records in the Contact Plan are processed, then the Tailored Contact Plan for the particular target node is completed, and at 350, the Tailored Contact Plan is used to transmit data through the DTN. As indicated at 352, the use of the Tailored Contact Plan to transmit data through the DTN prevents data from being transmitted to a node that does not have resources to support the data or a node that is not authorized to have access to the data. As indicated at 354, when a record in the Contact Plan is not written to the Tailored Contact Plan as a result of either operations 340, or 342, or 344, then the current record is discarded and the remaining records in the Contact Plan are processed.

Figure 4B:
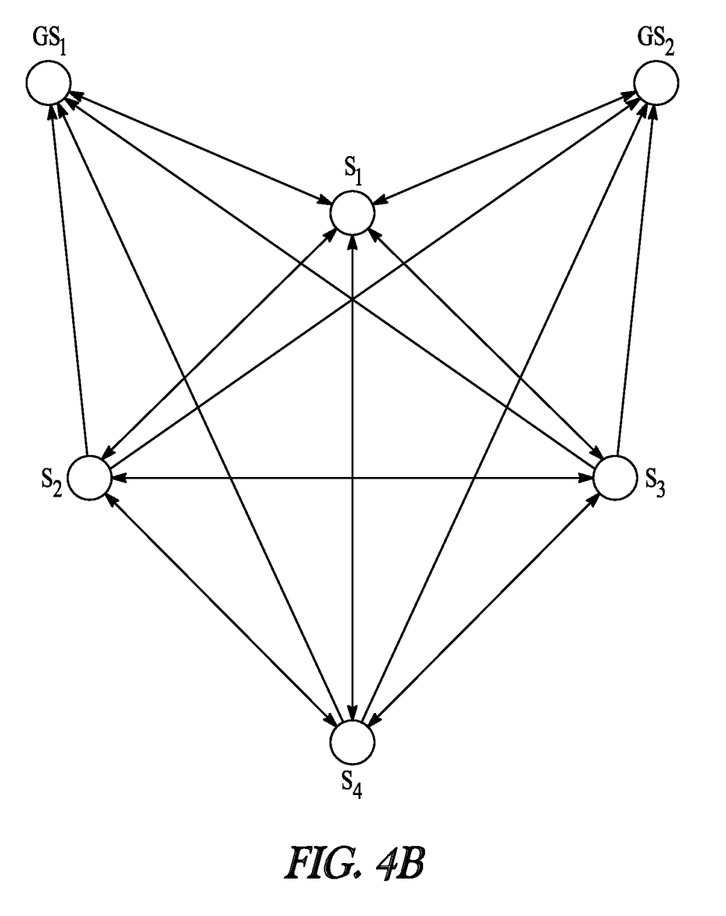

FIGS. 4A, 4B, 5A, 5B, 6A, and 6B illustrate examples of a contact plan tailoring process. Referring to FIGS. 4A and 4B, the target node is $S_1$, and $GS_1$ and $GS_2$ are restricted nodes. A range record or line 410A is simply written to the Tailored Contact Plan because it is not a contact command (FIG. 1, 130). A contact command 410B however is written to the Tailored Contact Plan because its source 420 is $S_2$, which is not a restricted node $GS_1$ or $GS_2$ and $S_2$ is not the target node $S_1$ (FIG. 1, 140). In contrast, the contact command at 415 is not written to the Tailored Contact Plan because its destination node 425 is $S_2$ which is not the target node $S_1$ (FIG. 1, 150). FIG. 4B illustrates that $S_1$ can send and receive data with $GS_1$ and $GS_2$ (as indicated by the bidirectional arrows between $S_1$ and $GS_1$ and $S_1$ and $GS_2$), but $GS_1$ and $GS_2$ appear to $S_1$ to only be able to receive data from $S_2$, $S_3$, and $S_4$ (as indicated by the unidirectional arrows between $S_2$ and $GS_1$ and $GS_2$, between $S_3$ and $GS_1$ and $GS_2$, and between $S_3$ and $GS_1$ and $GS_2$).

Figure 5A:
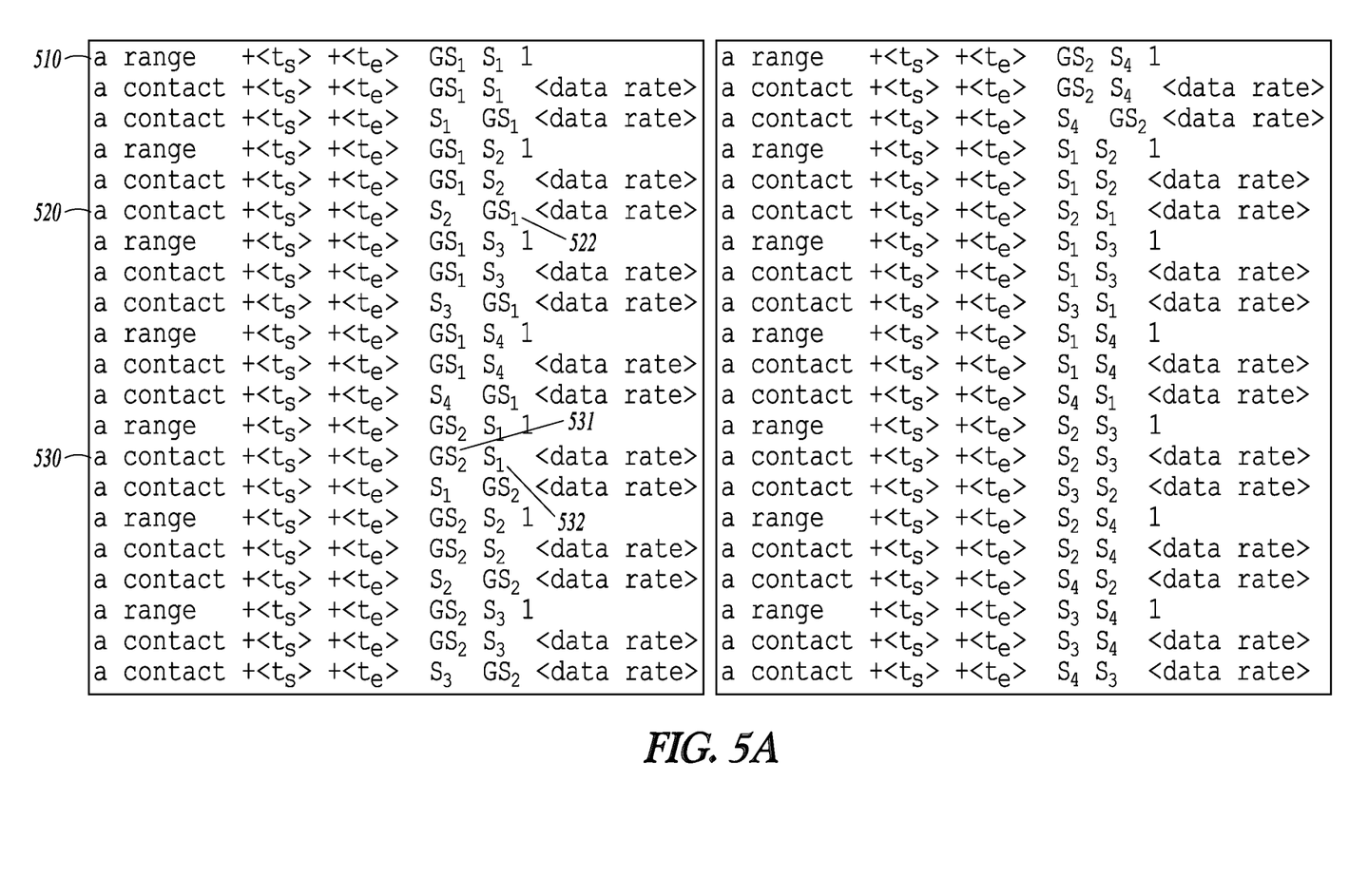
FIGS. 5A and 5B illustrate another example embodiment of the creation of a Tailored Contact Plan.
Figure 5B:
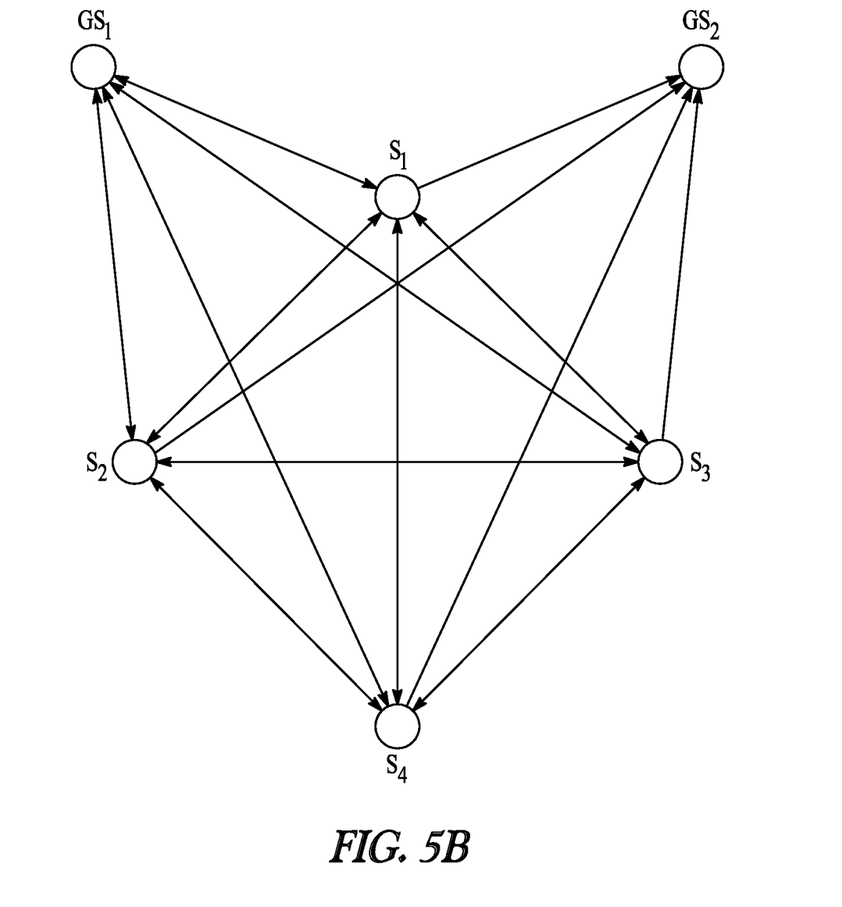

Referring to FIGS. 5A and 5B, the target node is $GS_1$, and $GS_2$ is a restricted node. A range record or line 510 is simply written to the Tailored Contact Plan because it is not a contact command (FIG. 1, 130). A contact command 520 however is written to the Tailored Contact Plan because its destination node 522 is $GS_1$, which is the target node (FIG. 1, 150). In contrast, the contact command at 530 is not written to the Tailored Contact Plan because while its source node 531 is $GS_2$ (a restricted node), the source node 531/$GS_2$ is not the target node $GS_1$ (FIG. 1, 140). Additionally, the destination node 532/$S_1$ is not the target node $GS_1$ (FIG. 1, 150). FIG. 5B illustrates that $GS_1$ can send and receive data (as indicated by the bi-directional arrows), but that $GS_2$ appears to $GS_1$ to only be able to receive data (as indicated by the uni-directional arrows).

Figure 6A:
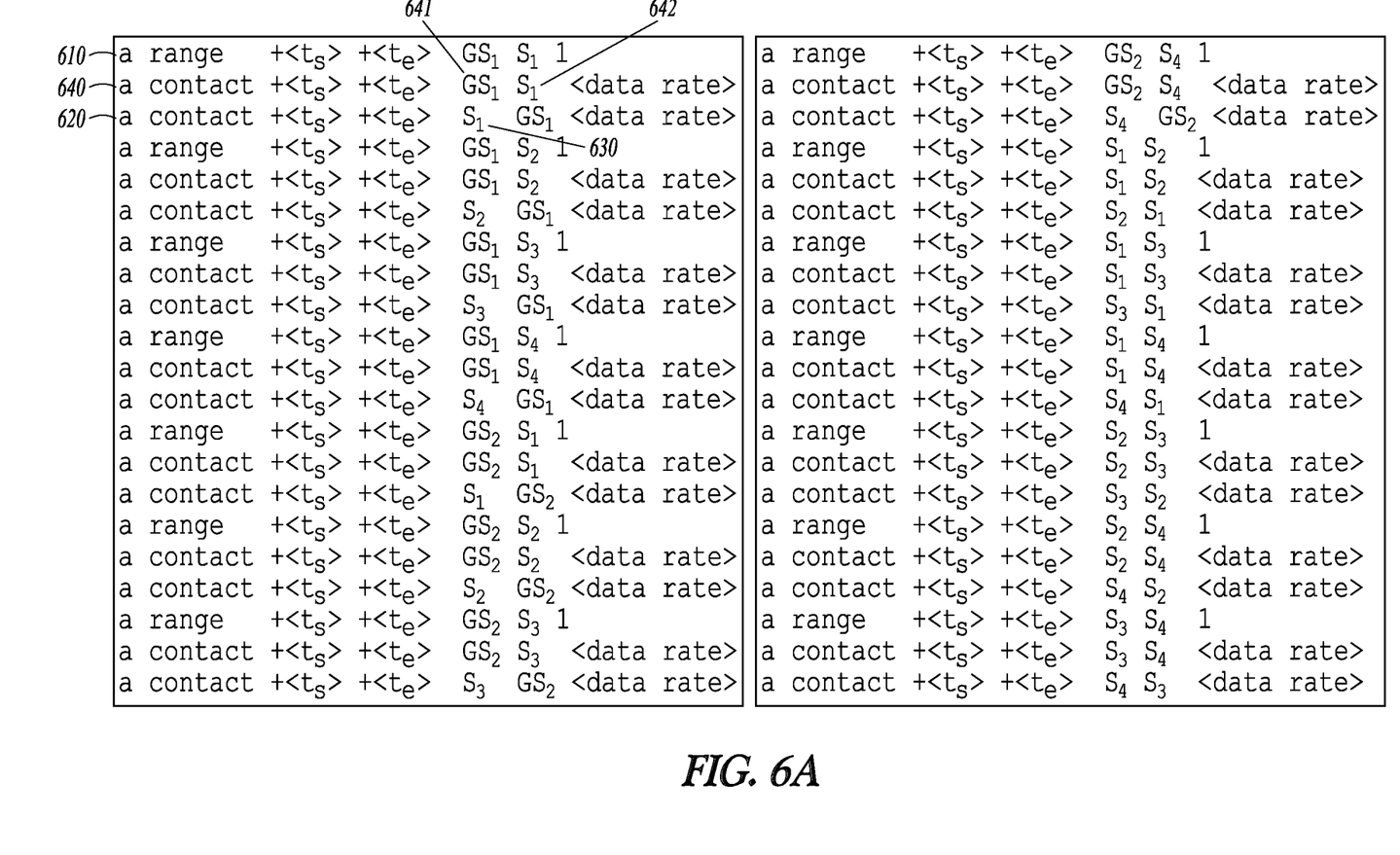
FIGS. 6A and 6B illustrate another example embodiment of the creation of a Tailored Contact Plan.
Figure 6B:
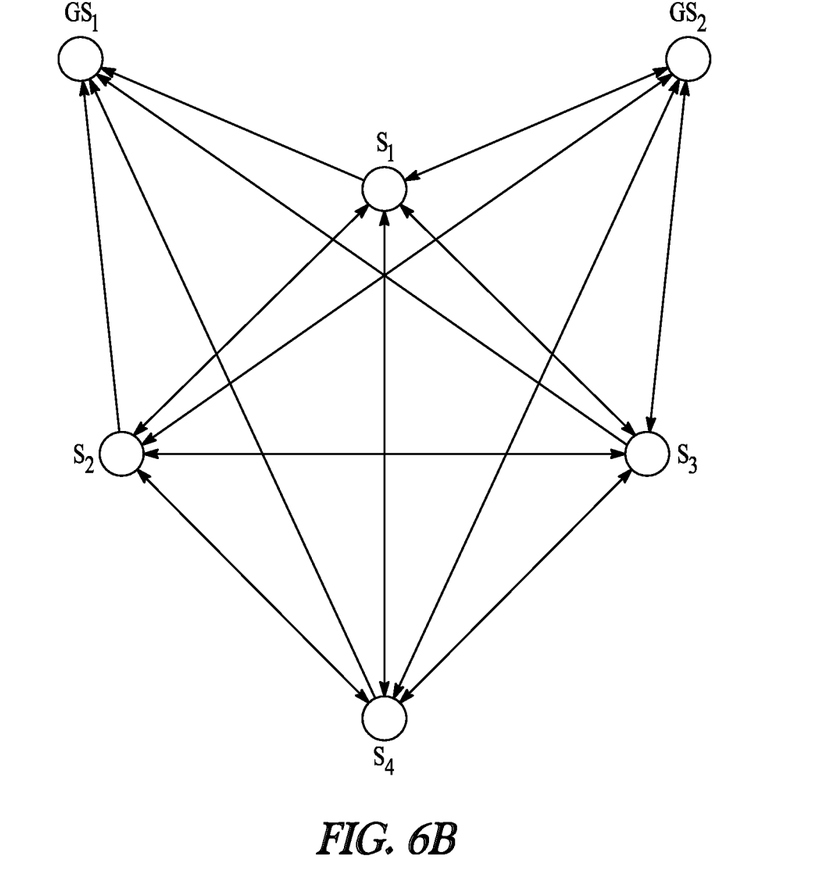

Referring to FIGS. 6A and 6B, the target node is $GS_2$, and the restricted node is $GS_1$. A range record or line 610 is simply written to the Tailored Contact Plan because it is not a contact command (FIG. 1, 130). A contact command 620 however is written to the Tailored Contact Plan because its source node 630 is $S_1$, which is not a restricted node and which is not the target node (FIG. 1, 140). In contrast, the contact command at 640 is not written to the Tailored Contact Plan because its source node 641/$GS_1$ is a restricted node and it is not the target node $GS_2$ (FIG. 1, 140), and its destination node 642 is $S_1$ which is not the target node $GS_2$. FIG. 6B illustrates by the bidirectional arrows that $GS_2$ can send and receive data, but as indicated by the unidirectional arrows $GS_1$ appears to $GS_2$ to only be able to receive data.

Figure 7:
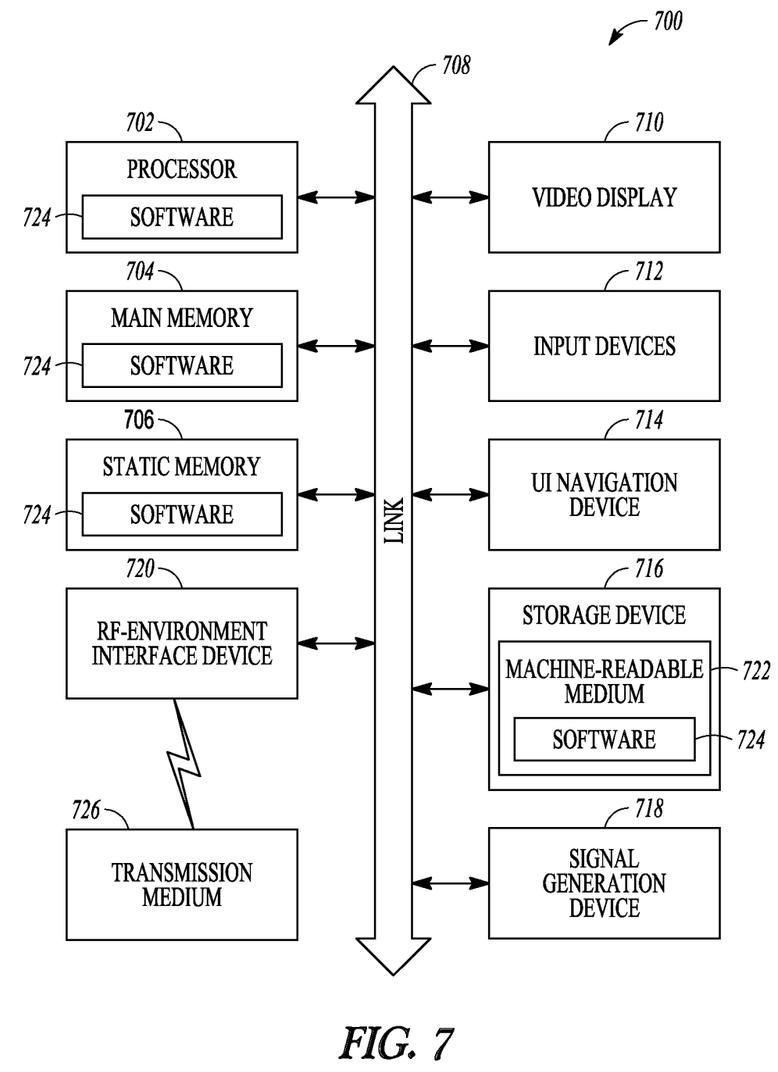
FIG. 7 is a block diagram of a computer architecture upon which one or more embodiments of the present disclosure can execute.

FIG. 7 is a block diagram illustrating a computing and communications platform 700 in the example form of a general-purpose machine on which some or all of the operations of FIGS. 2 and 3 may be carried out according to various embodiments. In certain embodiments, programming of the computing platform 700 according to one or more particular algorithms produces a special-purpose machine upon execution of that programming. In a networked deployment, the computing platform 700 may operate in the capacity of either a server or a client machine in server-client network environments, or it may act as a peer machine in peer-to-peer (or distributed) network environments.

Example computing platform 700 includes at least one processor 702 (e.g., a central processing unit (CPU), a graphics processing unit (GPU) or both, processor cores, compute nodes, etc.), a main memory 704 and a static memory 706, which communicate with each other via a link 708 (e.g., bus). The computing platform 700 may further include a video display unit 710, input devices 712 (e.g., a keyboard, camera, microphone), and a user interface (UI) navigation device 714 (e.g., mouse, touchscreen). The computing platform 700 may additionally include a storage device 716 (e.g., a drive unit), a signal generation device 718 (e.g., a speaker), and a RF-environment interface device (RFEID) 720.

The storage device 716 includes a non-transitory machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the computing platform 700, with the main memory 704, static memory 706, and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

RFEID 720 includes radio receiver circuitry, along with analog-to-digital conversion circuitry, and interface circuitry to communicate via link 708 according to various embodiments. Various form factors are contemplated for RFEID 720. For instance, RFEID may be in the form of a wideband radio receiver, or scanning radio receiver, that interfaces with processor 702 via link 708. In one example, link 708 includes a PCI Express (PCIe) bus, including a slot into which the NIC form-factor may removably engage. In another embodiment, RFEID 720 includes circuitry laid out on a motherboard together with local link circuitry, processor interface circuitry, other input/output circuitry, memory circuitry, storage device and peripheral controller circuitry, and the like. In another embodiment, RFEID 720 is a peripheral that interfaces with link 708 via a peripheral input/output port such as a universal serial bus (USB) port. RFEID 720 receives RF emissions over wireless transmission medium 726. RFEID 720 may be constructed to receive RADAR signaling, radio communications signaling, unintentional emissions, or some combination of such emissions.

Examples, as described herein, may include, or may operate on, logic or a number of components, circuits, or engines, which for the sake of consistency are termed engines, although it will be understood that these terms may be used interchangeably. Engines may be hardware, software, or firmware communicatively coupled to one or more processors in order to carry out the operations described herein. Engines may be hardware engines, and as such engines may be considered tangible entities capable of performing specified operations and may be configured or arranged in a certain manner. In an example, circuits may be arranged (e.g., internally or with respect to external entities such as other circuits) in a specified manner as an engine. In an example, the whole or part of one or more computing platforms (e.g., a standalone, client or server computing platform) or one or more hardware processors may be configured by firmware or software (e.g., instructions, an application portion, or an application) as an engine that operates to perform specified operations. In an example, the software may reside on a machine-readable medium. In an example, the software, when executed by the underlying hardware of the engine, causes the hardware to perform the specified operations. Accordingly, the term hardware engine is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which engines are temporarily configured, each of the engines need not be instantiated at any one moment in time. For example, where the engines comprise a general-purpose hardware processor configured using software; the general-purpose hardware processor may be configured as respective different engines at different times. Software may accordingly configure a hardware processor, for example, to constitute a particular engine at one instance of time and to constitute a different engine at a different instance of time.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A process comprising:

receiving a first data set into a computer processor, the first data set comprising records of network management commands, the network management commands comprising contact commands and range commands that represent a contact plan of communication opportunities between nodes in a network;

receiving a second data set into the computer processor, the second data set comprising an identification of one or more restricted nodes in the network;

receiving an identification of a target node into the computer processor;

processing one or more records in the first data set by:
(a) writing a record to a third data set when the record is not a contact command;
(b) writing the record to the third data set when the record comprises the contact command, and a source node in the record is not one of the restricted nodes or the source node in the record is the target node; and
(c) writing the record to the third data set when the record comprises the contact command and a destination node in the record is the target node;

wherein the target node uses the third data set to route data through the network.

2. The process of claim 1, wherein the network comprises a delay tolerant network or a disruption tolerant network.

3. The process of claim 1, wherein each of the one or more restricted nodes is limited to functioning as a data source and a data sink only for its own data; and wherein each of the one or more restricted nodes does not route data that are not destined for it.

4. The process of claim 1, wherein the nodes in the network comprise one or more of a satellite, an airborne vehicle, a ground station, and a sea-based station.

5. The process of claim 1, wherein the first data set further comprises distances or data transmission rates between the nodes in the network, node time directives, and performance management directives.

6. The process of claim 1, comprising refraining from writing the record to the third data set when neither (a), nor (b), nor (c) is satisfied.

7. The process of claim 1, comprising discarding the record when neither (a), nor (b), nor (c) is satisfied such that the record is not written to the third data set.

8. The process of claim 1, wherein routing the data through the network by the target node using the third data set prevents data from being routed through a node that does have resources to support further routing of the data or a node that is not authorized to have access to the data.

9. A non-transitory computer-readable medium comprising instructions that when executed by a processor executes a process comprising:

receiving a first data set into a computer processor, the first data set comprising records of network management commands, the network management commands comprising contact commands and range commands that represent a contact plan of communication opportunities between nodes in a network;

receiving a second data set into the computer processor, the second data set comprising an identification of one or more restricted nodes in the network;

receiving an identification of a target node into the computer processor;

processing one or more records in the first data set by:
(a) writing a record to a third data set when the record is not a contact command;
(b) writing the record to the third data set when the record comprises the contact command, and a source node in the record is not one of the restricted nodes or the source node in the record is the target node; and
(c) writing the record to the third data set when the record comprises the contact command and a destination node in the record is the target node;

wherein the target node uses the third data set to route data through the network.

10. The non-transitory computer-readable medium of claim 9, wherein the network comprises a delay tolerant network or a disruption tolerant network.

11. The non-transitory computer-readable medium of claim 9, wherein each of the one or more restricted nodes is limited to functioning as a data source and a data sink only for its own data; and wherein each of the one or more restricted nodes does not route data that are not destined for it.

12. The non-transitory computer-readable medium of claim 9, wherein the nodes in the network comprise one or more of a satellite, an airborne vehicle, a ground station, and a sea-based station.

13. The non-transitory computer-readable medium of claim 9, wherein the first data set further comprises distances or data transmission rates between the nodes in the network, node time directives, and performance management directives.

14. The non-transitory computer-readable medium of claim 9, comprising instructions for refraining from writing the record to the third data set when neither (a), nor (b), nor (c) is satisfied.

15. The non-transitory computer-readable medium of claim 9, comprising instructions for discarding the record when neither (a), nor (b), nor (c) is satisfied such that the record is not written to the third data set.

16. The non-transitory computer-readable medium of claim 9, wherein routing the data through the network by the target node using the third data set prevents data from being routed through a node that does have resources to support further routing of the data or a node that is not authorized to have access to the data.

17. A system comprising:

a computer processor; and a computer memory coupled to the computer processor;

wherein the computer processor and computer memory are operable for:

receiving a first data set into a computer processor, the first data set comprising records of network management commands, the network management commands comprising contact commands and range commands that represent a contact plan of communication opportunities between nodes in a network;

receiving a second data set into the computer processor, the second data set comprising an identification of one or more restricted nodes in the network;

receiving an identification of a target node into the computer processor;

processing one or more records in the first data set by:

(a) writing a record to a third data set when the record is not a contact command;
(b) writing the record to the third data set when the record comprises the contact command, and a source node in the record is not one of the restricted nodes or the source node in the record is the target node; and
(c) writing the record to the third data set when the record comprises the contact command and a destination node in the record is the target node;

wherein the target node uses the third data set to route data through the network.

18. The system of claim 17, wherein each of the one or more restricted nodes is limited to functioning as a data source and a data sink only for its own data; and wherein each of the one or more restricted nodes does not route data that are not destined for it.

19. The system of claim 17, wherein the computer processor and computer memory are operable for discarding the record when neither (a), nor (b), nor (c) is satisfied such that the record is not written to the third data set.

20. The system of claim 17, wherein routing the data through the network by the target node using the third data set prevents data from being routed through a node that does have resources to support further routing of the data or a node that is not authorized to have access to the data.

* * * * *